March 17, 1931.  A. S. CAMERON  1,796,359
OPTICAL INSTRUMENT
Filed Jan. 27, 1930  3 Sheets-Sheet 2
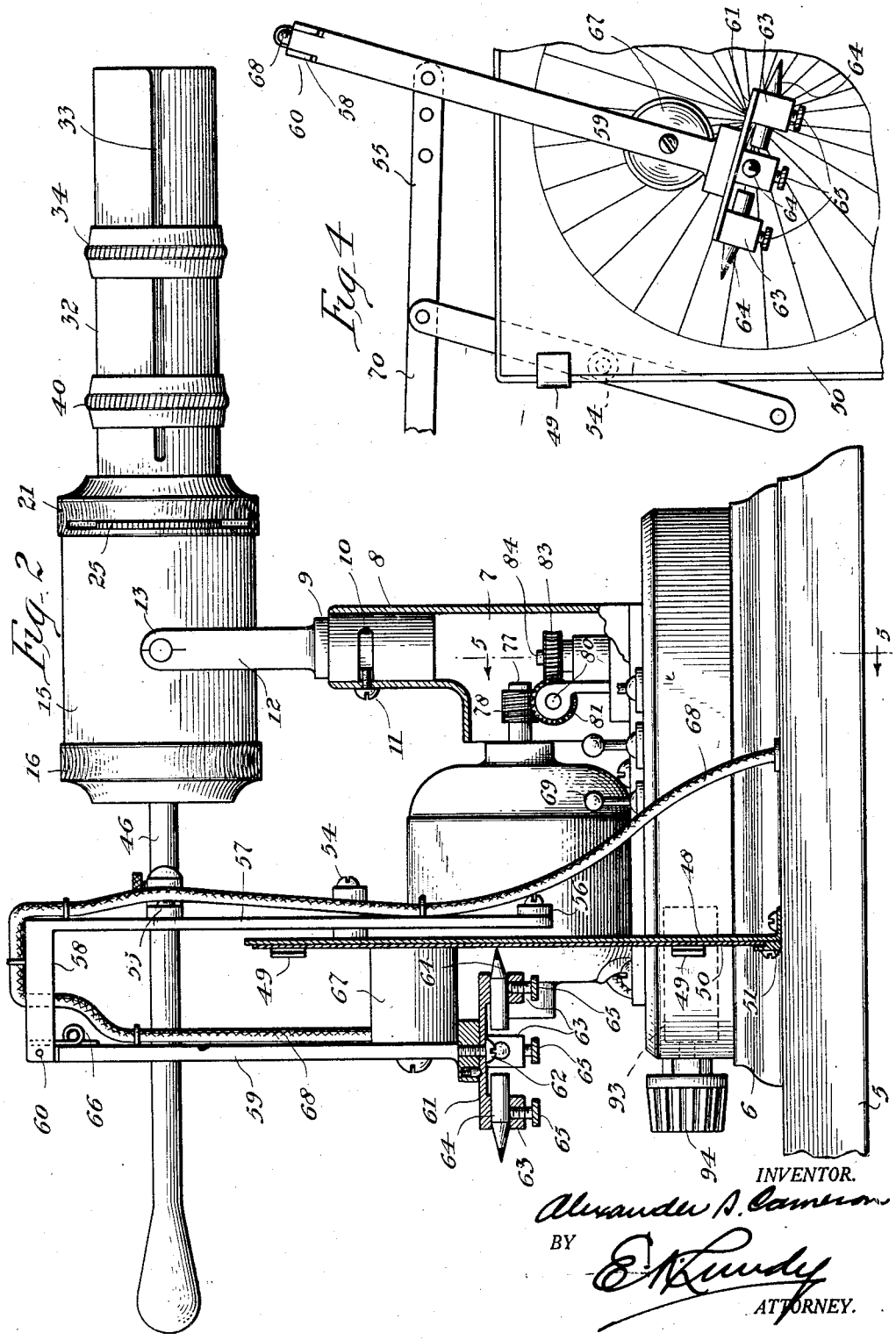
INVENTOR.
Alexander S. Cameron
BY
E. K. Lundy
ATTORNEY.

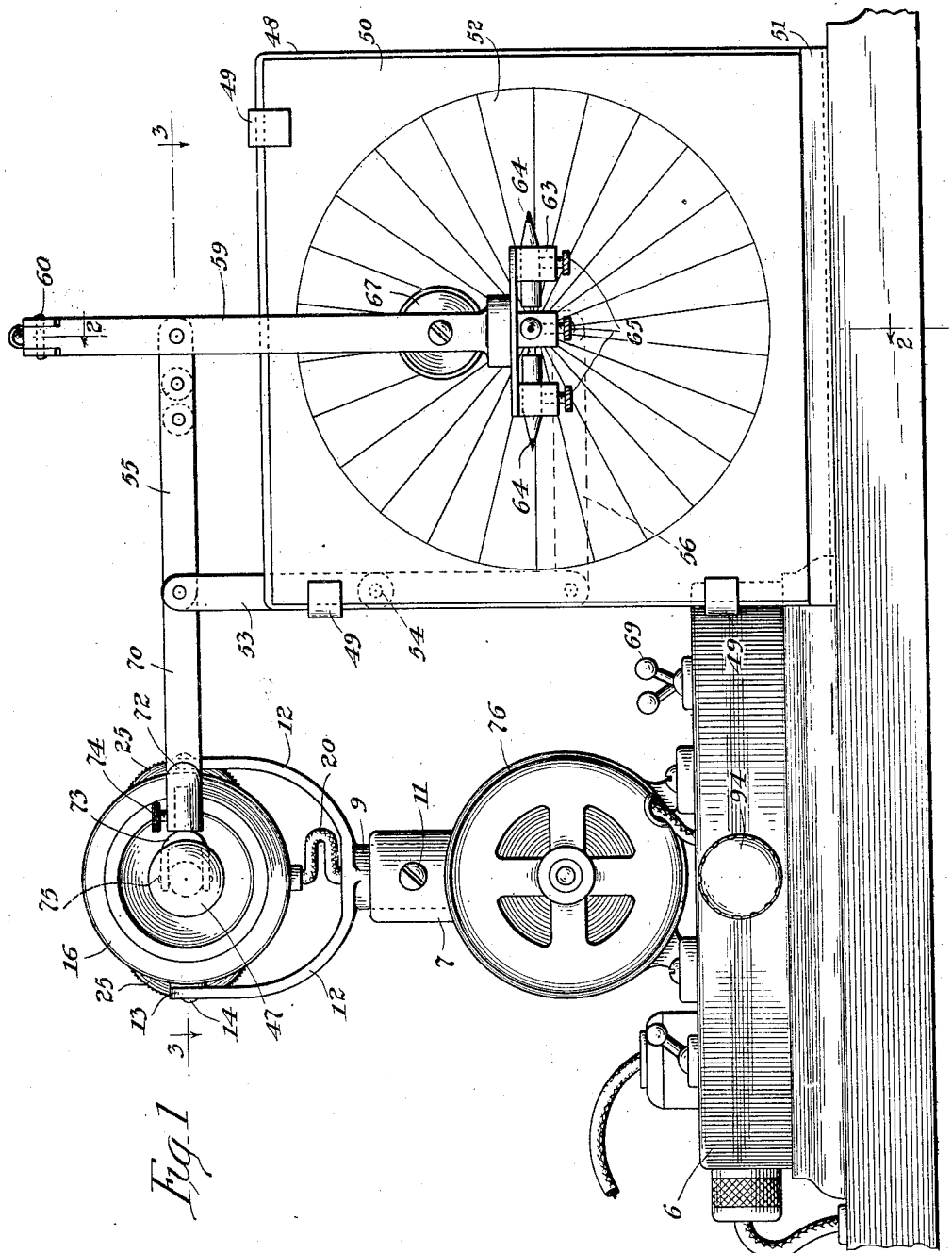

March 17, 1931.  A. S. CAMERON  1,796,359
OPTICAL INSTRUMENT
Filed Jan. 27, 1930    3 Sheets-Sheet 3
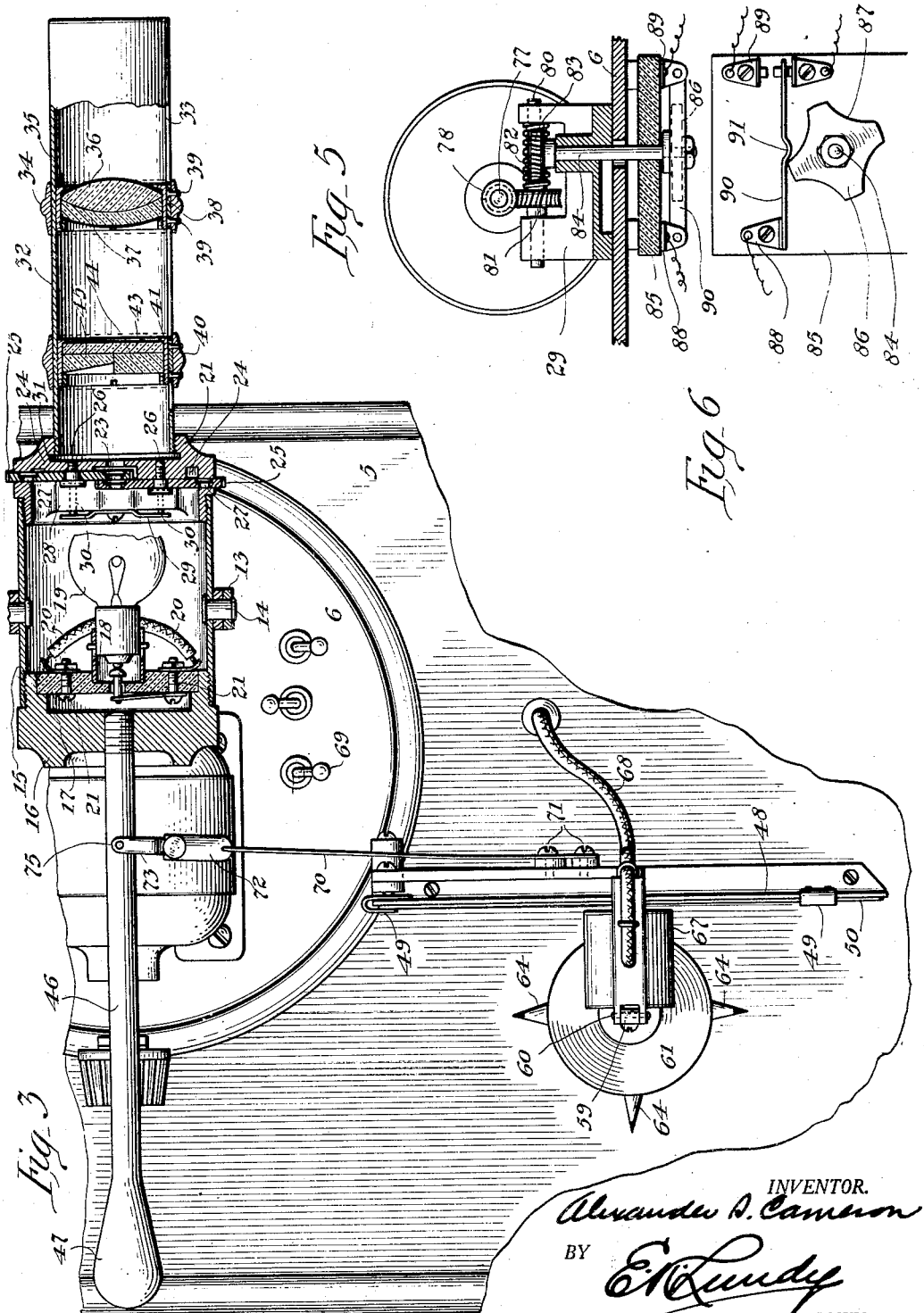

Patented Mar. 17, 1931

1,796,359

UNITED STATES PATENT OFFICE

ALEXANDER S. CAMERON, OF CHICAGO, ILLINOIS, ASSIGNOR TO WILLIAM J. CAMERON, OF CHICAGO, ILLINOIS

OPTICAL INSTRUMENT

Application filed January 27, 1930. Serial No. 423,613.

My present invention relates to optical instruments and it has particular reference to an instrument that includes a projector to cast an illuminated image or test object upon a screen where it may be observed by the patient under examination or treatment. By moving the image to different positions upon the screen the points at which the image disappears to the patient may be ascertained; and, by the mechanism I have devised, these points may be indicated upon a chart associated with the projector. The points are ascertained by means of a parallelogram frame pivotally anchored upon the chart carrying plate and connected through a universal joint with a portion of the movable projector structure. The stylus with which the marks are made upon the chart may be readily changed as to color in order that the operator may ascertain the boundaries of a patient's color field as well as the visual field.

Another feature of this device is that I have provided motor-driven automatic mechanical means for intermittently flashing the light or lamp by which the image or test object is projected upon the screen, and in conjunction with such mechanism I have provided means for controlling the speed of the motor in order that the operator may increase or decrease the timing of the image flashes. This permits the adjustment the length of the period of illumination as well as the length of the period the lamp is shut off.

There are numerous objects in view in devising this instrument, among which may be mentioned the provision of an optical instrument that is novel in construction, dependable in operation, effective in performing its functions, and sturdy in the formation and arrangement of its parts. I prefer to accomplish these objects and to carry out my invention by means of the structure hereinafter fully described and as more particularly pointed out in the appended claims, reference herein made to the accompanying drawings that form a part of this specification.

In the drawings:—

Figure 1 is an elevation of the structure looking at the portion thereof that is farthest from the screen or what might be termed the front or patient's and operator's side of the instrument.

Figure 2 is a vertical side elevation of the instrument viewed on the plane of the line 2—2 of Figure 1, and a portion of the standard being broken away.

Figure 3 is a fragmentary top plan, with the projection tube shown in horizontal longitudinal section, the view being on the plane of line 3—3 of Figure 1.

Figure 4 is a detailed view showing relative positions of the delineating device when the projector is moved.

Figure 5 is a detail view partly in section of the motor actuated gearing for operating the mechanical flashing or make-and-break device.

Figure 6 is a detail in underneath plan of the make-and-break device.

The structure I have devised consists of a rectangular flat plate 5 upon which the projector device, the chart or diagram rack, and the delineating device are mounted. The projector includes a suitable base 6 of circular outline that is securely mounted upon the flat plate 5 and has an irregularly shaped upright standard 7 thereon that is centrally bored to provide a socket 8 for the axially rotatable post 9 of the projector. The post has a transverse groove or channel 10 in the portion that is within the socket and a guide screw or bolt 11 screwed transversely into the adjacent wall of the socket acts as a retainer to prevent accidental removal of the post from the socket but permits the post and the projector to be rotated upon the axis of said post in a manner that is readily understood.

A pair of supporting arms 12 of compound curved or ogee shape project upwardly from the leg 9 and at their outer ends which are spaced apart are provided with alining facing bearings 13 to receive the trunnions 14 of the oscillatory and rotatable image projecting elements of the instrument. This structure comprises a lamp housing that consists of a tube 15, that is carried by the trunnions, the rear end of which is closed by a cap 16 that is screwed thereon and carries an insulation disk 17 that is provided with a socket 18 for an electric lamp or bulb 19. The conductors 20 enter the housing through an insulated aperture in the bottom of tube 15 and lead to the binding posts 21 upon the disk from which the usual electric connections are made with the socket and bulb.

The opposite end of the housing has a cap 22 screwed into it and is provided centrally with an aperture 23 and upon diametrically opposite sides of the aperture there are bosses 24 for the mounting of the shutter or screens 25 that are rotatably mounted upon the respective bosses by means of shouldered screws 26. There are a plurality of apertures 27 arranged concentrically about the axis of each shutter 25, and the shutters have portions of their edges extended through transverse slots in the end cap 22 so that they may be rotated, the apertures 27 being so arranged that they may be successively moved into alinement with each other on the respective shutters and with the projection aperture 23 in the cap.

The shutter apertures contain colored screens and images of different shapes so that images having different forms may be projected from the instrument either in colors or without coloration as desired depending upon the service to which the instrument is being put. At one side of the interior of cap 22 there is an embossment 28 to which a spring 29 is secured intermediate its ends and its ends carry transverse pins 30 to engage notches or depressions made in the faces of the shutters 25 so as to maintain the latter in their adjusted positions, but permit their ready rotation or adjustment whenever desired.

The outer portion of end cap 22 is provided with a recess 31 the sides of which are threaded to receive the projection tube 32 that is threaded at its inner end and screwed therein. The tube 32 has an elongated longitudinal slot 33 open at the outer end to permit the mounting and longitudinal adjustment of the condensing lens unit and the prism device, it being understood that the latter is omitted from the tube except in cases where it is desired to project two colored images upon the screen.

The condensing lens construction consists of an exterior ring 34 that slides upon the exterior of tube 32 and carries a lens ring 35 in which is mounted the double-convex lens 36 and the concavo-convex lens 37. The lens ring 35 is of such exterior diameter and is spaced away from the interior surface of the carrier ring 34 a distance sufficient to permit said lens ring to enter and be moved longitudinally within the projection tube 32 while ring 34 is on the outside of the tube, such spacing of the rings being accomplished by interposing a small spacer block 38 between adjacent faces of the rings and the connecting of the rings by screws 39 that pass through the outer carrier ring, the block, and into the inner lens ring. It will be understood the spacer block 38 is of such dimension that it will enter the slot 33 in the projection tube when the lens structure is mounted upon said tube and it may be moved back and forth and maintained in adjusted positions due to the frictional fit of the parts.

The prism structure consists of an exterior ring 40 that may be mounted upon the tube and has a carrier ring 41 spaced from its inner circumference by the spacer block in the same manner as the rings in the condensing lens structure, and the carrier ring contains a plain disk 43 back of which there is placed the colored glass semi-circular disks 44 and 45 the former of which is plane and the latter of which is prismatic in cross-section. The semi-circular disks 44 and 45 are of complementary colors so that, when an image from the shutters 25 is projected through the same, the light rays, bending through the prism 45 but passing straight through plane disk 44, will cause a separation of the light rays with the result that two spaced images will be projected upon the screen in the complementary colors of the prism device.

The distance these images are separated from each other upon the screen depends upon the distance the prisms are positioned from the shutters 25, and this separation of the projected images may be adjusted by sliding the prism-carrying ring longitudinally upon the projection tube.

In order to move the projection tube for positioning the image upon the screen a rod 46 is screwed axially into the cap 16 at the rear of the projection tube and the said rod is provided upon its free end with a handle 47 by which it may be readily grasped by the operator for manipulation.

Combined with the projection structure is a device for graphically delineating the visual and color fields of a patient so that a record thereof may be retained by the person examining or testing the eyes. This structure consists of a holder or plate 48 secured in an upright position upon the base plate 5 and alongside the base 6 of the structure hereinbefore described. The plane of the holder 48 is at a right angle to the axis of the projection tube when the latter is pointing straight ahead at a right-angle to the screen upon which the image is thrown. Means, in the form of spring clips 49, retain the chart or card 50 upon the grooved strip 51 at the bottom of the holder. Upon the face of the chart or card 50 is a diagram 52 showing the principal meridians or degrees of a circle which are used in making the readings from the delineated outline of a patient's visual or color fields.

The structure for marking the field upon the chart consists of a movable frame the sides and ends of which are hinged to each other in the form of a parallelogram. This parallelogram comprises an anchored side rail 53 pivoted intermediate its ends upon a pin 54 projecting from the rear of the back plate 48. At its upper and lower ends the side rail 53 has pivotal or hinge connections with the adjacent ends of the top and bottom cross-bars 55 and 56 of the parallelogram frame. A second side rail 57 has pivotal connection at its lower end with the adjacent end of the bottom cross-bar 56 and at a point opposite the upper end of the anchored side rail the rail 57 is pivotally connected to the top cross-bar 55. The side rail 57 extends beyond its pivotal connection with the top cross bar 55 and at its upper end is formed with a lateral extension 58 that overhangs the chart holder 48 and the chart or card thereon in the manner shown in Figure 2.

A depending arm 59 is swingingly mounted upon a pivot pin 60 at the end of the lateral extension 58 and hangs down in front of the chart or card 50 to a point formally in the plane of the focus of the meridians upon the chart, as shown in Figure 1 of the drawings. The lower end of the arm 59 carried the marking device which is in the form of a disk 61 disposed horizontally or transverse to arm 59 and connected to the lower enlarged end of the arm by a screw 62, so that said disk may be readily rotated in the manner and for the purpose hereinafter pointed out. Upon its underside the disk there is provided one or more (preferably 4) concentrically arranged lugs or bosses 63 that are bored transverse to their axes to receive pencils, crayons, or the like, 64, that are secured in position by means of headed set-screws 65 that screw axially into the bosses in which the pencils are mounted.

The pencils preferably contain differently colored lead and when in normal position the point of a pencil to be used to delineate and is in close proximity to, but not touching, the adjacent surface of the chart or card that is to receive the record. The arm 59 is held normally away from the chart or card by means of a spring 66 engaged with the arm and the lateral extension adjacent the hinge, and when it is desired to mark a point upon the chart the arm is moved quickly towards the former so that the pencil point will impact the card at the location that has been ascertained. In order to do this work automatically I mount an electro-magnet 67 upon the back of the arm 59 which electro-magnet has its core close to the chart or card and the holder, which latter is of metal. The electric current is led to the magnet by a conductor cable 68 that is interrupted by a snap-switch 69 mounted at any convenient place upon the apparatus. After the position of the point has been indicated, the switch may be snapped and the electromagnet will be drawn towards the chart and holder, and the pencil 64 will place a dot upon the chart.

The manner of connecting the parallelogram or hinged frame to the projection tube consists of a yieldable metal strip 70 connected at one of its ends by the screws 71 to the rear face of the top cross bar 58 and at its opposite end has an enlargement 72 that is axially bored to receive the shank of a two-arm yoke 73, the shank being maintained in the bore by a set screw 74. The ends of the arms of yoke 73 are connected to the operating rod 46 by means of the transverse pivot pin 75.

Thus it will be seen that when the arm or rod 46 is moved and the image or test object is projected upon the screen in front of the projector the pencil or delineating point will be correspondingly moved upon the chart, and when the operator has ascertained the boundary of an optical field of a patient the switch 69 may be snapped and that point will be indicated upon the chart. When the color fields are being ascertained the disk is rotated so that a pencil of the corresponding color of the field is placed next the chart so that the points ascertained will not conflict with each other when the several fields are being marked upon the card or chart.

I have provided mechanical and electrical means for intermittently supplying the electric current to the bulb whenever it is desired to flash the image upon the screen. These means comprise a small electric motor 76, the spindle 72 of which carries a worm 78. A bearing bracket or plate 79 is mounted upon the upper surface of the base 6 within the standard adjacent the worm 78 and carries in its upper portion a rotatable horizontal shaft 80 which, between its bearings is provided with a worm gear 81 in mesh with the worm 78 and alongside the gear is a worm 82 that is in mesh with a worm gear 83 carried upon the upper end of a short shaft 84 arranged with its axis in a vertical plane. This shaft is long enough to extend it down through an opening in the upper surface of the base 6 as shown in Figure 5 of the drawings.

An insulation plate 85 is secured to the under portion of the base 6 and is provided with an aperture through which the spindle 84 extends and upon its lower extended end the spindle 84 has a disk 86 of insulating material secured to it. This disk, which is rotated by the motor, has its edge or periphery formed with undulations 87, the purpose of which will hereinafter appear. Terminal elements 88 and 89 are secured to the insulating plate 85 and the conductor leading to the lamp or bulb 19 within the projected tube is interrupted and has its ends connected to the respective terminals just described. A spring switch-arm 90 is secured to the terminal 88 and intermediate its ends is provided with a laterally bulged or offset portion 91 that engages the undulations on the rotatable disk. The free end of the switch arm 90 has a contact block 92 that is moved into and out of engagement with the contact upon the terminal 89 when the undulated disk 86 is rotated.

The speed with which the motor is moved is regulated by a controller 93 shown schematically in dotted lines in Figure 2 and the controller is manually regulated by a hand wheel or button 94 that is positioned upon the exterior of the base 6.

When the current is turned into the motor the latter rotates the undulated disk 86 by the worms and gears and when the controller button is adjusted in either direction the motor is increased or decreased in speed which correspondingly increases or decreases the speed of the disk and consequently regulates the time between as well as the length of the flashes of the image projected upon the screen by the bulb and projector tube.

What I claim is:—

1. A device of the kind described comprising a movable image projecting structure, means permitting the manual operation thereof, a chart adjacent said structure, and means actuated by the movement of said projecting structure for indicating said movement upon said chart.

2. A device of the kind described comprising a movable image projecting structure, means permitting the manual operation thereof, a chart adjacent said structure, means actuated by the movement of said projecting structure for moving a stylus to different positions with respect to said chart, and electro-responsive devices for causing said stylus to impact said chart.

3. A device of the kind described comprising an image projector, manually controlled means for moving said projector, a chart adjacent said projector, and devices connected to and moved to different positions by said projector whereby the movement of the latter is transmitted to and delineated upon said chart.

4. A device of the kind described comprising an image projector, manually controlled means for moving said projector, a chart adjacent said projector, a stylus movably mounted upon said chart, devices operatively connecting said stylus to said projector whereby the movement of the latter is communicated to said stylus, and electro-responsive means for causing said stylus to impact said chart to delineate thereon the movement of said projector.

5. A device of the kind described comprising a movable image projecting structure, means permitting the manual operation thereof, a chart adjacent said structure, and means actuated by the movement of said projecting structure for indicating said movement upon said chart, said indicating means including a parallelogram frame the members of which are pivotally connected to each other and one of said members is pivotally anchored adjacent the chart.

6. A device of the kind described comprising a movable image projecting structure, means permitting the manual operation thereof, a chart adjacent said structure, means actuated by the movement of said projecting structure for moving a stylus to different positions with respect to said chart, and electro-responsive devices for causing said stylus to impact said chart, said stylus moving means including a parallelogram frame the members of which are pivotally connected to each other and one of said members is pivotally anchored adjacent said chart.

7. A device of the kind described comprising an image projector, manually controlled means for moving said projector, a chart adjacent said projector, and devices connected to and moved to different positions by said projector whereby the movement of the latter is transmitted to and delineated upon said chart, said devices including a parallelogram frame the members of which are pivoted to each other and one of said members is pivotally anchored adjacent said chart, and a stylus connected to and movable with another of said members in front of said chart.

8. A device of the kind described comprising an image projector, manually controlled means for moving said projector, a chart adjacent said projector, a stylus movably mounted upon said chart, devices operatively connecting said stylus to said projector whereby the movement of the latter is communicated to said stylus, and electro-responsive means for causing said stylus to impact said chart to delineate thereon the movement of said projector, said devices including a pivoted parallelogram frame one member of which is anchored adjacent said chart and another member carries said stylus.

9. A device of the kind described comprising a movable image projecting structure, means permitting the manual operation thereof, a chart adjacent said structure, and means actuated by the movement of said projecting structure for indicating said movement upon said chart, and mechanically actuated devices for intermittently illuminating a lamp within the projecting structure.

10. A device of the kind described comprising a movable image projecting structure, means permitting the manual operation thereof, a chart adjacent said structure, means actuated by the movement of said projecting structure for moving a stylus to different positions with respect to said chart, and electro-responsive devices for causing said stylus to impact said chart, and mechanically actuated devices for intermittently illuminating a lamp within the projecting structure.

11. A device of the kind described comprising an image projector, manually controlled means for moving said projector, a chart adjacent said projector, devices connected to and moved to different positions by said projector whereby the movement of the latter is transmitted to and delineated upon said chart, and a motor driven make-and-break device for intermittently illuminating a lamp within the projecting structure.

12. A device of the kind described comprising an image projector, manually controlled means for moving said projector, a chart adjacent said projector, a stylus movably mounted upon said chart, devices operatively connecting said stylus to said projector whereby the movement of the latter is communicated to said stylus, electro-responsive means for causing said stylus to impact said chart to delineate thereon the movement of said projector, and a motor driven make-and-break device for intermittently illuminating a lamp within the projecting structure.

13. A device of the kind described comprising a movable image projecting structure, means permitting the manual operation thereof, a chart adjacent said structure, means actuated by the movement of said projecting structure for indicating said movement upon said chart, an automatic make-and-break mechanism in the circuit of a lamp within the projecting structure, and means for controlling the speed of said mechanism.

14. A device of the kind described comprising a movable image projecting structure, means permitting the manual operation thereof, a chart adjacent said structure, means actuated by the movement of said projecting structure for moving a stylus to different positions with respect to said chart, electro-responsive devices for causing said stylus to impact said chart, an automatic make-and-break mechanism in the circuit of a lamp within the projecting structure, and means for controlling the speed of said mechanism.

Signed at Chicago, in the county of Cook and State of Illinois, this 20th day of November, 1929.

ALEXANDER S. CAMERON.